(12) United States Patent
Choi (10) Patent No.: US 9,618,980 B2
(45) Date of Patent: Apr. 11, 2017

(54) PORTABLE TERMINAL (71) Applicant: SAMSUNG DISPLAY CO., LTD., Suwon-si, Gyeonggi-do (KR)

(72) Inventor: Hyun-Gyu Choi, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 120 days.

(21) Appl. No.: 13/963,206

(22) Filed: Aug. 9, 2013

(65) Prior Publication Data

US 2014/0240276 A1  Aug. 28, 2014

(30) Foreign Application Priority Data

Feb. 25, 2013  (KR) .................... 10-2013-0019946

(51) Int. Cl.
*G06F 3/01* (2006.01)
*G06F 1/16* (2006.01)

(52) U.S. Cl.
CPC .......... *G06F 1/1684* (2013.01); *G06F 1/1664* (2013.01)

(58) Field of Classification Search
None
See application file for complete search history.

(56) References Cited

U.S. PATENT DOCUMENTS

| 6,203,190 B1* | 3/2001 | Stotz | G04C 3/005 368/190 |
| 2006/0199607 A1* | 9/2006 | Shi | G06F 1/1624 455/550.1 |
| 2010/0110044 A1* | 5/2010 | Englund | G06F 1/1626 345/184 |
| 2010/0155215 A1* | 6/2010 | Zuo | H01H 15/10 200/550 |
| 2013/0109311 A1* | 5/2013 | Moosavi | G06K 7/0008 455/41.1 |
| 2013/0335373 A1* | 12/2013 | Tomiyasu | G06F 3/016 345/174 |

FOREIGN PATENT DOCUMENTS

| JP | 2009-169575 A | 7/2009 | |
| JP | WO 2012114760 A1 * | 8/2012 | ............ G06F 3/016 |
| KR | 10-2005-0021820 A | 3/2005 | |
| TW | 201135520 A | 10/2011 | |

* cited by examiner

*Primary Examiner* — Seokyun Moon
*Assistant Examiner* — Douglas Wilson
(74) *Attorney, Agent, or Firm* — Lee & Morse, P.C.

(57) ABSTRACT

A portable terminal includes a body, and an input part on a side of the body, the input part having a changeable position.

17 Claims, 7 Drawing Sheets

PORTABLE TERMINAL

CROSS-REFERENCE TO RELATED APPLICATION

The present application claims priority to and benefit of Korean Patent Application No. 10-2013-0019946, filed on Feb. 25, 2013, in the Korean Intellectual Property Office, and entitled: "Portable Terminal," which is incorporated by reference herein in its entirety.

BACKGROUND

1. Field

Example embodiments relate to a portable terminal.

2. Description of the Related Art

Recently, use of portable terminals has been rapidly spreading due to their portability. Accordingly, terminal manufacturers competitively develop portable terminals with more convenient functions in order to secure more users. Portable terminals may provide functions for, e.g., games, a scheduler, a message service, an Internet service, an email service, a wake-up call, a MP3, a digital camera, etc.

A portable terminal may have at least one function button for, e.g., executing or stopping a specific function, controlling a volume, or turning on/off a screen. The function button may be disposed at, e.g., the side of the portable terminal. The function button may be fixed to a specific position of the portable terminal, and the terminals may have their function buttons disposed at different positions.

The above information disclosed in this Background section is only for enhancement of understanding of the background of the invention and therefore it may contain information that does not form the prior art that is already known in this country to a person of ordinary skill in the art.

SUMMARY

Example embodiments have been made in an effort to provide a portable terminal having advantages of changing the position of an input unit disposed at the side of the portable terminal by a user.

An exemplary embodiment of the example embodiments provides a portable terminal including a body and an input part disposed at a side of the body such that the position thereof is changed.

The input part may be slidable on the side of the body.

The input part may be rotatable 360 degrees along the side of the body.

The input part may be slidable on a part of the side of the body.

The input part may include: a sliding part slidable along a guide formed at the side of the body; a button part formed at one side of the sliding part and sensing a user input to generate an input signal; a transmission part formed at the other side of the sliding part and transmitting the input signal to the body; and a receiving part formed at one side of the body and receiving the input signal from the transmission part.

The guide may include guide protrusions, and guide grooves slidably combined with the guide protrusions may be formed at the side of the sliding part, corresponding to the guide protrusions.

The guide may include guide grooves, and guide protrusions slidably combined with the guide grooves may be formed at the side of the sliding part, corresponding to the guide grooves.

The guide protrusions may have a thickness corresponding to the guide grooves.

The sliding part may be formed of a flexible material.

The portable terminal may include a plurality of button parts.

The button part and the transmission part may be disposed facing each other.

The input signal may be transmitted upon contact of the transmission part and the receiving part.

The button part may be formed at the one side of the sliding part in a protruded form.

The transmission part and the receiving part may be formed of a conductive material.

The button part may be a touch switch.

The button part may be a capacitive touch switch.

The button part may be a resistive touch switch.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The size and thickness of each component are illustrated discretionally for better understanding and ease of description, and thus the example embodiments are not limited thereto. For example, in the drawings, the thicknesses of layers, films, panels, regions, etc., may be exaggerated for clarity.

It will be understood that when an element such as a layer, film, region, or substrate is referred to as being "on" another element, it can be directly on the other element or intervening elements may also be present. Also, it will be understood that when an element is referred to as being "on" another element, it can be on or beneath the other element.

In addition, unless explicitly described to the contrary, the word "comprise" and variations such as "comprises" or "comprising", will be understood to imply the inclusion of stated elements but not the exclusion of any other elements.

Figure 1:
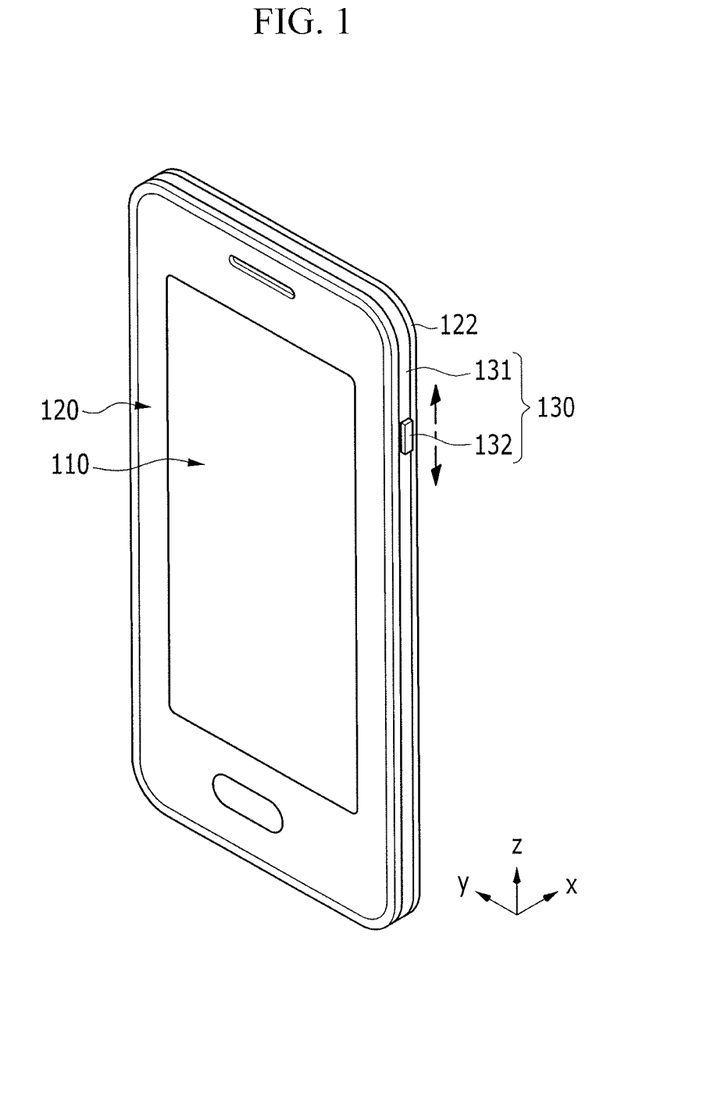
FIG. 1 illustrates a perspective view of a portable terminal according to a first exemplary embodiment.
Figure 2:
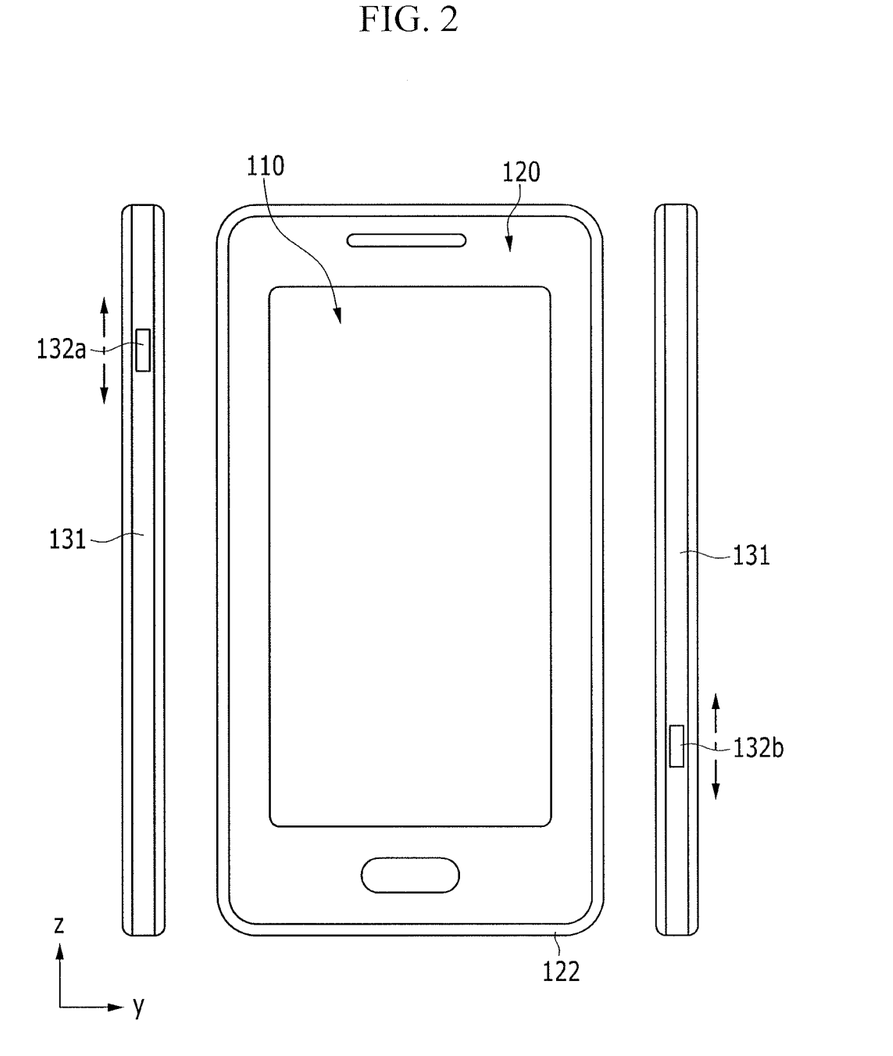
FIG. 2 illustrates front and side views of a portable terminal according to an exemplary embodiment.

Referring to FIGS. 1 and 2, a portable terminal according to a first exemplary embodiment is configured such that a position of an input part thereof may be arbitrarily changed by a user. The portable terminal may include a body 120, a display 110, and an input part 130.

According to the first exemplary embodiment, the body 120 forms, e.g., defines, the shape of the portable terminal. A device, e.g., a circuit board, a battery, etc., necessary to operate the portable terminal may be included in the body 120. Any suitable body of a portable terminal may be employed as the body 120, so a detailed description thereof is omitted.

The display 110 displays image information, e.g., text messages, video, pictures, etc. Like the body 120, any suitable display of a portable terminal may be used as the display 110, so a detailed description thereof is omitted.

Referring to FIGS. 1 and 2, the input part 130 receives an input signal of the user to execute a specific function of the portable terminal. For example, the input signal may correspond to a command signal input by the user to execute or stop a specific function.

The input part 130 may be disposed on the body 120, such that the position thereof may be changed, i.e., a changeable position. That is, while the input part 130 is disposed on the body 120, the position of the input part 130 is not fixed to one specific location on the body 120, e.g., the input part 130 is not stationary on the body 120. For example, the input part 130 may be disposed on the body 120, e.g., on a lateral side of the body 120, in a slidable manner, so the input part 130 may be moved along a surface, e.g., along the lateral side, of the body 120. For example, as will be apparent to a person of ordinary skill in the art from the foregoing description and from FIGS. 1-2, the input part 130 may move vertically along the side of the body 120 (as indicated by the arrows pointing up and down in FIGS. 1-2).

However, movement of the input part 130 is not limited to the above. According to the first exemplary embodiment, as will be apparent to a person of ordinary skill in the art from the foregoing description and from the drawings, the input part 130 may move along an entire circumference of the body 120, e.g., the input part 130 may move along each of four lateral sides of the body 120 to completely surround the circumference of the body 120 and arrive at its starting point. In other words, the input part 130 may be rotated 360 degrees along the circumference of the body 120. For example, the input part 130 in FIG. 1 may slide upward along the z-axis toward an upper edge of the body 120, turn around the edge of the body 120 to continue along the y-axis, etc., until the input part 130 reaches its starting point on the body 120. Therefore, the user may move and position the input part 130 to any desired position along the entire circumference of the body 120.

However, the position of the input part 130 is not limited to the above. For example, the input part 130 may slide only on a part of the side of the body 120. That is, the input part 130 may be disposed, such that it may slide only on a part of the side of the body 120, e.g., only on the left or only on right side of the body 120, as illustrated in FIG. 2.

Figure 3:
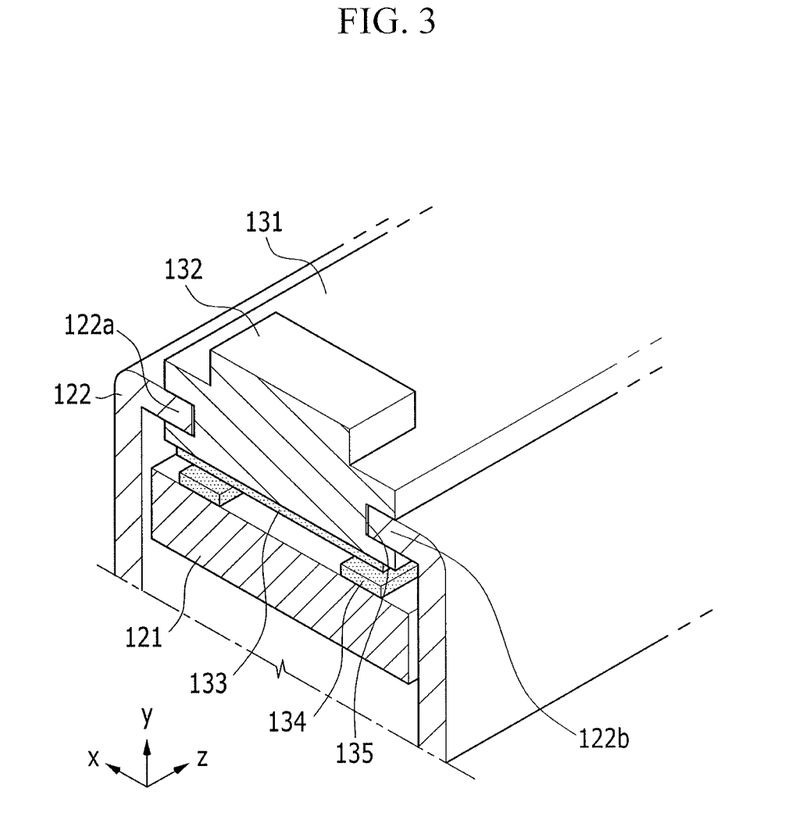
FIG. 3 illustrates a perspective view of a cross section of an input part of the portable terminal shown in FIG. 1.

Referring to FIG. 3, the input part 130 of the portable terminal according to the first exemplary embodiment may include a sliding part 131, a button part 132, and a transmission part 133.

The sliding part 131 may slide along the lateral circumference of the body 120. More specifically, the sliding part 131 may be moved along a guide 122 formed at the side of the body 120.

For example, as will be apparent to a person of ordinary skill in the art from the foregoing description and from the drawings, the guide 122 may extend along the, e.g., entire, circumference of the body 120, and may include guide protrusions 122a and 122b along the, e.g., entire, circumference of the body 120. As illustrated in FIG. 3, the guide protrusions 122a and 122b are spaced apart by a predetermined distance and disposed facing each other. That is, a pair of the guide protrusions 122a and 122b may be disposed on the lateral circumference of the body 120, facing each other.

According to the first exemplary embodiment, the guide protrusions 122a and 122b are disposed facing each other, and are open in the direction of the outside of the body 120. More specifically, the guide protrusions 122a and 122b may have a rectangular tubular shape with part of one side open, e.g., facing edges of the guide protrusions 122a and 122b may be spaced apart from each other along the x-axis to define a space therebetween.

According to the first exemplary embodiment, a guide groove 135 may be formed at a side of the sliding part 131, which may be slidably combined with the guide protrusions 122a and 122b. That is, the guide groove 135 may be formed along the side of the sliding part 131, and may correspond to the guide protrusions 122a and 122b. In other words, as shown in FIG. 3, the guide protrusions 122a and 122b may be inserted into the guide groove 135, so the guide groove 135 may fit into the space defined between the facing edges of the guide protrusions 122a and 122b, and may slide along the guide protrusions 122a and 122b. Therefore, the guide protrusions 122a and 122b may have a thickness corresponding to a width of the guide groove 135. For example, the thickness of the guide protrusions 122a and 122b, e.g., along the y-axis, may be smaller than the width of the guide groove 135, e.g., along the y-axis.

The sliding part 131 may be a bar-type member. For example, the sliding part 131 may cover the side of the body 120 with both ends thereof connected, e.g., the sliding part 131 may be a, e.g., continuous, member having a length along the entire circumference of the body 120. In another example, the sliding part 131 may cover the side of the body 120 with both ends thereof separated from each other, e.g., a length of the sliding part 131 may only partially cover the circumference of the body 120. The sliding part 131 may be formed of a flexible material, e.g., the sliding part 131 may be formed of a rubber material or any other suitable material exhibiting elasticity. Accordingly, the sliding part 131 may cover the side of the body 120, while conforming to the shape of the body 120. Furthermore, the sliding part 131 may slide along the shape of the side of the body 120.

According to the first exemplary embodiment, the button part 132 may be formed at one side of the sliding part 131, e.g., on a top of the sliding part 131. The button part 132 senses an input of the user using the portable terminal. For example, if the input part 130 is used to execute a camera function of the portable terminal, the user may generate an input signal by pressing the button part 132. Here, the input signal corresponds to a command signal by which the user instructs the camera function to be executed or stopped.

According to the first exemplary embodiment, the button part 132 may protrude from one side, e.g., surface, of the sliding part 131. The button part 132 may be formed in a protruding shape in order to allow the user to easily recognize the button part 132. For example, the button part 132 may be integrated with the sliding part 131. However, the button part 132 is not limited thereto, e.g., the button part 132 may be separated from the sliding part 131 and may be attached to one side of the sliding part 131.

Figure 4:
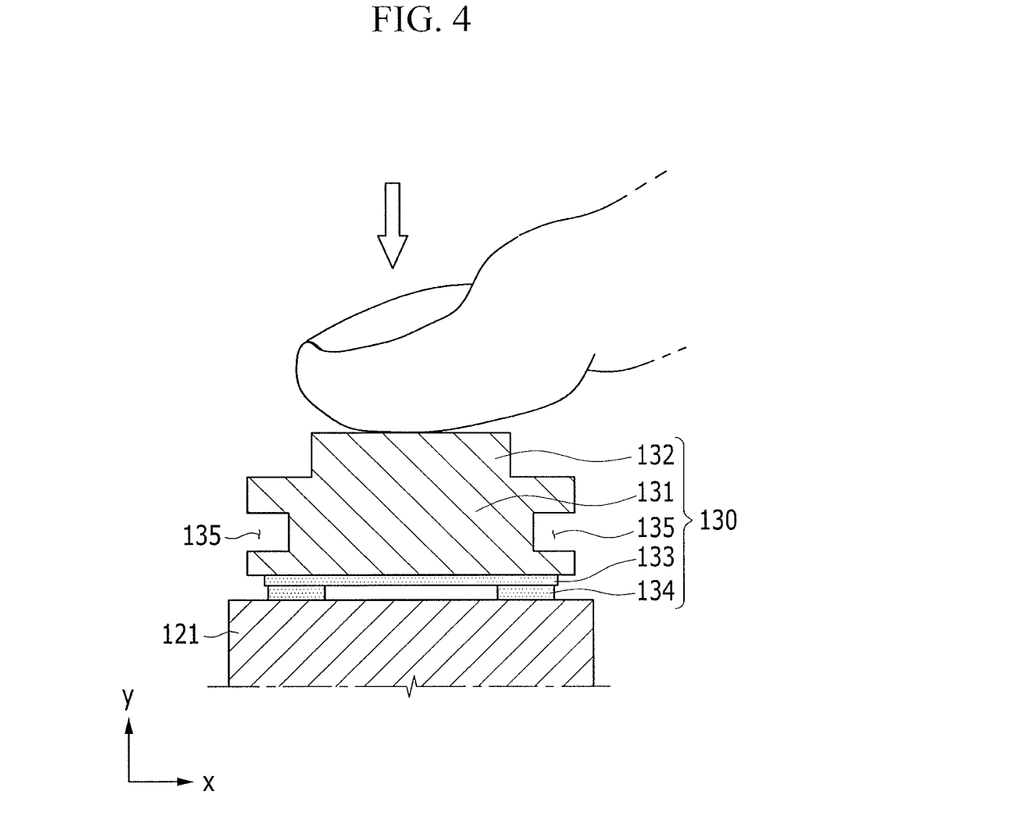
FIG. 4 illustrates a cross-sectional view of the input part of the portable terminal shown in FIG. 1 when a user presses the input part.

Referring to FIGS. 3 and 4, when the user presses the protruding button part 132, the transmission part 133 and a receiving part 134, which will be described below, contact each other. Upon contact of the transmission part 133 and the receiving part 134, the input signal from the user is transmitted to the inside of the body 120 of the portable terminal. That is, the portable terminal performs the desired function, e.g., executes or stops the camera function.

The shape of the button part 132 is not limited to the protruding shape, e.g., the button part 132 may be flush with one side of the sliding part 131. When the button part 132 is flush with the side of the sliding part 131, a specific symbol may be marked on the side of the sliding part 131, e.g., on a surface of the sliding part 131 corresponding to the button part 132, to mark the bottom part 132 for the user.

Referring to FIG. 2, a plurality of button parts 132a and 132b may be formed on the sliding part 131. In this case, specific functions of the portable terminal may be respectively allocated to each one of the plurality of button parts 132a and 132b. For example, as will be apparent to a person of ordinary skill in the art from the foregoing description and from FIG. 2, each one of the plurality of button parts 132a and 132b may be independently positioned by the user on a different part of the sliding part 131, e.g., the button parts 132a and 132b may be on opposite side of the display 110.

Referring to FIGS. 3 and 4, the transmission part 133 is formed at the other side of the sliding part 131. For example, as will be apparent to a person of ordinary skill in the art from the foregoing description and from FIGS. 3-4, the transmission part 133 and the button part 132 are formed on opposite sides, e.g., surfaces, of the sliding part 131. Therefore, the button part 132 is on top of the sliding part 131 above the guide protrusions 122a and 122b, and the transmission part on a bottom of the sliding part 131 below the guide protrusions 122a and 122b, e.g., below the guide groove 135. The transmission part 133 comes into contact with the receiving part 134 formed in the body 120 when the button part 132 is pressed.

According to the first exemplary embodiment, when the user applies a physical force to the button part 132 to press the button part 132, the guide protrusions 122a and 122b formed at the side of the body 120 are bent toward the inside of the body 120. Thus, the transmission part 133 is moved along with the sliding part 131 toward the inside of the body 120. Accordingly, the transmission part 133 may contact the receiving part 134.

The guide protrusions 122a and 122b may be formed of a material having elasticity. Accordingly, the guide protrusions 122a and 122b may be bent in the direction of the inside of the body 120 when the user presses the button part 132. When the user releases the button part 132, the guide protrusions 122a and 122b may be returned to their initial position, i.e., to their position before pressing the button part 132.

According to another exemplary embodiment, when the user presses the button part 132 with a physical force, only the sliding part 131 may be bent in the direction of the inside of the body 120. Accordingly, the transmission part 133 may be moved to the inside of the body 120 with the sliding part 131 to contact the receiving part 134.

The transmission part 133 may be formed of a conductive material. Accordingly, when the transmission part 133 contacts the receiving part 134, the transmission part 133 and the receiving part 134 may be electrically connected to each other. Furthermore, the receiving part 134, which will be described below, may also be formed of a conductive material.

The receiving part 134 is formed inside the body 120, e.g., on a support 121 inside the body 120. Here, the receiving part 134 contacts the transmission part 133 to transmit an input signal generated through the button part 132 to the inside of the body 120. As described above, the receiving part 134 is electrically connected to the transmission part 133 to transmit the input signal to the inside of the body 120.

According to the first exemplary embodiment, the transmission part 133 and the button part 132 may be disposed facing each other. For example, the transmission part 133 and the button part 132 may be disposed in the vertical direction facing each other.

Figure 5:
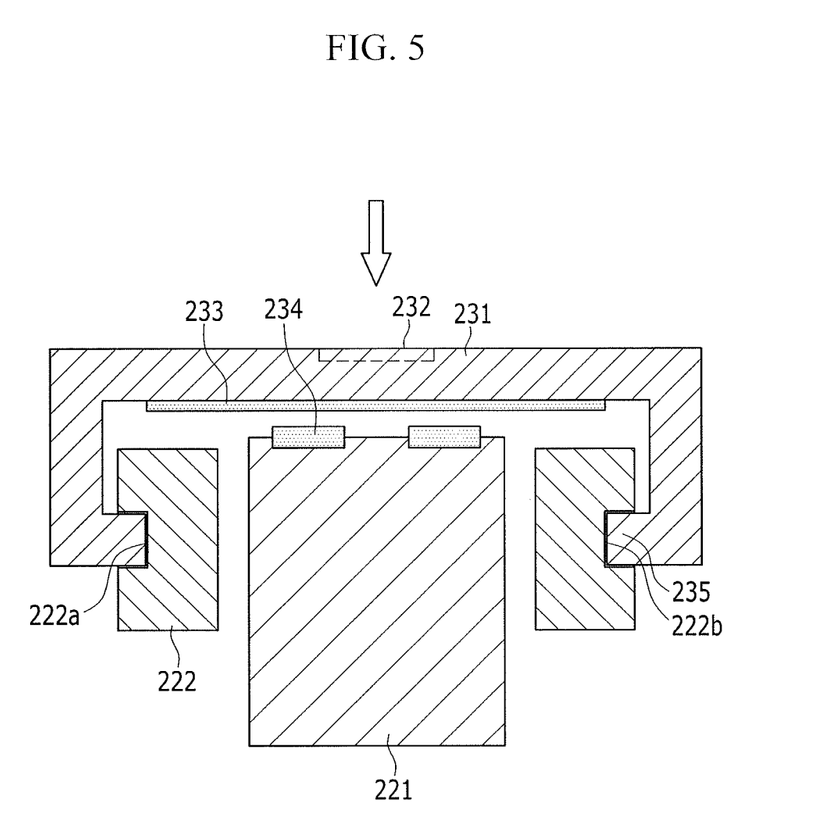
FIG. 5 illustrates a cross-sectional view of an input part of a portable terminal according to a second exemplary embodiment.

FIG. 5 illustrates a cross-sectional view of an input part of a portable terminal according to a second exemplary embodiment. Referring to FIG. 5, according to the second exemplary embodiment, an input part 230 may include a sliding part 231, a button part 232, and a transmission part 233.

The sliding part 231 may slide on a lateral circumference of a body 220. The sliding part 231 may be moved along a guide formed on a side 222 of the body 220. According to the second exemplary embodiment, the guide may include guide grooves 222a and 222b in the side 222 of the body 220, as shown in FIG. 5.

A guide protrusion 235 slidably combined with the guide grooves 222a and 222b may be formed at the side of the sliding part 231. For example, the guide protrusion 235 may be formed along the side of the sliding part 231, and may correspond to the guide grooves 222a and 222b in the body 220. As shown in FIG. 5, the guide protrusion 235 may be inserted into the guide grooves 222a and 222b, and may slide along the guide grooves 222a and 222b.

According to the second exemplary embodiment, the button part 232 may be formed at one side of the sliding part 231. For example, the button part may be formed on a top surface of the sliding part 231. For example, the button part may be flush with the top surface of the sliding part 231 and marked with a symbol, e.g., in FIG. 5 the button part is below the arrow on the top surface of the sliding part 231. However, the button part is not limited thereto, e.g., the button part may be formed on the sliding part 231 in a protruding shape.

Figure 6:
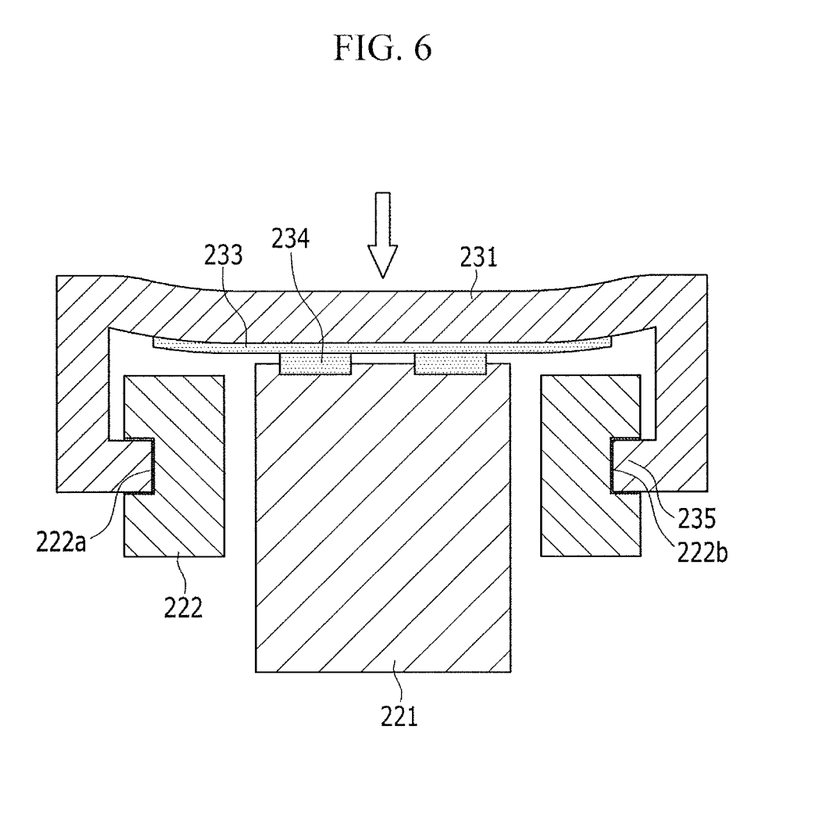
FIG. 6 illustrates a cross-sectional view of the input part shown in FIG. 5 when the input part is pressed.

Referring to FIG. 6, when the user applies a physical force to the button part in order to press the button part, the sliding part 231 may be bent in the direction of the inside of the body. Accordingly, a transmission part 233 may be moved toward the inside of the body, e.g., toward a support 221 inside the body, to contact a receiving part 234.

Figure 7:
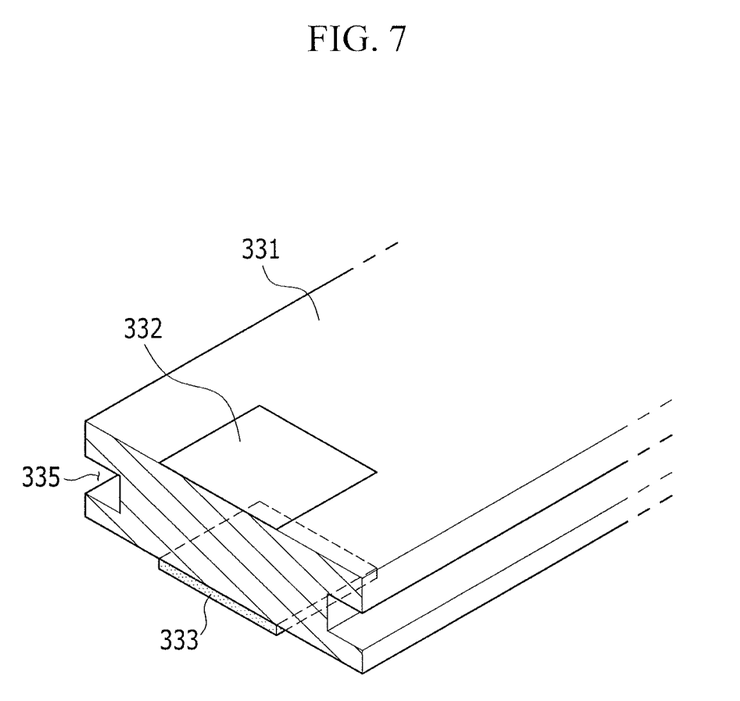
FIG. 7 illustrates a perspective view of a cross section of an input part of a portable terminal according to a third exemplary embodiment.

FIG. 7 illustrates a perspective view of an input part of a portable terminal according to a third exemplary embodiment.

According the third exemplary embodiment, a button part 332 may be a touch switch. For example, the button part 332 may be a capacitive or a resistive touch switch.

For example, when the button part 332 is implemented as a capacitive touch switch, the user may touch the button part 332 formed at one side of a sliding part 331 with a finger, without applying a physical force thereto, such that an input signal from the user may be transmitted to the inside of the body of the portable terminal. In another example, if the button part 332 is implemented as a resistive touch switch, a transmission part 333 contacts the receiving part when the user touches the button part 332 with a finger or pen, e.g., it is determined whether to transmit an input signal by detecting a resistance variation at the contact position. Any suitable capacitive or resistive touch switch may be employed as the button part, and thus a detailed description thereof is omitted.

According to embodiments, a portable terminal may include a movable input part, so the position of the input part may be changed to a desired position of a user. Such a portable terminal may be conveniently used, since the user may freely move the input part disposed in the body of the portable terminal to a desired position. In contrast, a conventional portable terminal includes a function button fixed to a specific position, so a user has to use the fixed function button even if the position is inconvenient due to, e.g., different hand sizes or different patterns of use.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A portable terminal, comprising:
    a body; and
    an input part on the body, the input part having a changeable position,
    wherein the input part includes a sliding part slidable along a lateral surface of the body without triggering transmission of any signal to the body, and
    wherein the input part is rotatable 360 degrees along an entire circumference of the body.

2. The portable terminal as claimed in claim 1, wherein the input part includes:
    the sliding part slidable along a guide, the guide being on the side of the body;
    a button part on a first side of the sliding part, the button part sensing a user input and generating the input signal;
    a transmission part on a second side of the sliding part, the transmission part transmitting the generated input signal to the body; and
    a receiving part on the body, the receiving part receiving the input signal from the transmission part.

3. The portable terminal as claimed in claim 2, wherein:
    the guide includes guide protrusions, and
    the sliding part includes guide grooves, the guide grooves being slidably combined with the guide protrusions.

4. The portable terminal as claimed in claim 3, wherein the guide protrusions have a thickness corresponding to the guide grooves.

5. The portable terminal as claimed in claim 2, wherein:
    the guide includes guide grooves, and
    the sliding part includes guide protrusions, the guide protrusions being slidably combined with the guide grooves.

6. The portable terminal as claimed in claim 5, wherein the guide protrusions have a thickness corresponding to the guide grooves.

7. The portable terminal as claimed in claim 2, wherein the sliding part includes a flexible material.

8. The portable terminal as claimed in claim 2, further comprising a plurality of button parts.

9. The portable terminal as claimed in claim 2, wherein the button part and the transmission part are on opposite sides of the sliding part and facing each other.

10. The portable terminal as claimed in claim 2, wherein the input signal is transmitted upon contact of the transmission part and the receiving part.

11. The portable terminal as claimed in claim 10, wherein the button part is formed at the one side of the sliding part in a protruded form.

12. The portable terminal as claimed in claim 11, wherein the transmission part and the receiving part are conductive.

13. The portable terminal as claimed in claim 2, wherein the button part is a touch switch.

14. The portable terminal as claimed in claim 2, wherein the button part is a capacitive touch switch.

15. The portable terminal as claimed in claim 2, wherein the button part is a resistive touch switch.

16. A portable terminal, comprising:
    a body; and
    an input part on the body, the input part having a changeable position,
    wherein the input part includes:
    an input part on the body, the input part having a changeable position regardless of its operational state,
    wherein the input part includes:
    a sliding part slidable along a guide, without triggering transmission of a signal to the body and without changing a state of an input signal, the guide being on a side of the body;
    a button part on a first side of the sliding part, the button part sensing a user input and generating the input signal;
    a transmission part on a second side of the sliding part, the transmission part transmitting the generated input signal to the body; and
    a receiving part on the body, the receiving part receiving the input signal from the transmission part, and
    the sliding part is a continuous member along an entire circumference of the body.

17. The portable terminal as claimed in claim 2, wherein the sliding part is slidable along the lateral surface of the body independently of a connection between the transmission part and the receiving part.

* * * * *